(12) United States Patent
Ohata

(10) Patent No.: US 7,618,512 B2
(45) Date of Patent: Nov. 17, 2009

(54) DIAGONAL LAMINATED VENEER LUMBER AND METHOD OF MANUFACTURING THE SAME

(75) Inventor: Hiroshi Ohata, Shimane (JP)

(73) Assignee: Shimane Prefecture, Shimane (JP)

( * ) Notice: Subject to any disclaimer, the term of this patent is extended or adjusted under 35 U.S.C. 154(b) by 88 days.

(21) Appl. No.: 12/030,451

(22) Filed: Feb. 13, 2008

(65) Prior Publication Data

US 2008/0121334 A1 May 29, 2008

Related U.S. Application Data

(62) Division of application No. 10/538,304, filed as application No. PCT/JP03/15841 on Dec. 11, 2003, now Pat. No. 7,384,675.

(30) Foreign Application Priority Data

Dec. 11, 2002 (JP) .............................. 2002-359896

(51) Int. Cl.
*B27D 1/04* (2006.01)
(52) U.S. Cl. .................... 156/258; 156/300; 156/304.1; 144/355; 144/363
(58) Field of Classification Search ................ 156/258, 156/300, 304.1; 144/355, 363
See application file for complete search history.

(56) References Cited

U.S. PATENT DOCUMENTS 5,507,905 A 4/1996 Kairi

FOREIGN PATENT DOCUMENTS

| JP | 52-025174 B2 | 7/1977 |
|----|--------------|--------|
| JP | 62-103914 U  | 7/1987 |
| JP | 02-301401 A  | 12/1990 |
| JP | 05-004202 A  | 1/1993 |
| JP | 06-206205 A  | 7/1994 |
| JP | 08-105155 A  | 4/1996 |
| JP | 09-248803 A  | 9/1997 |

OTHER PUBLICATIONS

PCT International Search Report for PCT/JP03/15841 mailed on Apr. 13, 2004.

*Primary Examiner*—Alexander Thomas
(74) *Attorney, Agent, or Firm*—Cheng Law Group, PLLC

(57) ABSTRACT

A veneer laminated material formed by improving a laminated material formed in a plate or column shape by stacking a plurality of sheet-like veneers overlapping with each other and adhering them to each other, and a method of manufacturing the veneer laminated material. The method comprises the steps of forming the veneers into parquet-like veneers formed by longitudinally arranging the plurality of divided small veneer pieces in a parquetry pattern continuously with each other, intersecting the fiber directions of the parquet-like veneers aslant with the longitudinal side ends of the parquet-like veneers, and laminating and forming the veneer laminated material by arranging the fiber directions of the parquet-like veneers adjacent to each other in a laminated layer cross section so as to be reversed to each other and intersected with each other. The fiber directions of the small veneer pieces may be intersected with the cut sides of the small veneer pieces or the fiber directions may be set in the generally same directions as the direction of the cut sides of the small veneer pieces.

3 Claims, 4 Drawing Sheets

PRIOR ART

LOAD-DISPLACEMENT CURVE (kgf/cm²) 75-95

(PLYWOOD)

185-250

165-200

(PB)

DIAGONAL LAMINATED VENEER LUMBER AND METHOD OF MANUFACTURING THE SAME

This application is a divisional application of application Ser. No. 10/538,304, filed on Jun. 9, 2005, now U.S. Pat. No. 7,384,675 which is a 371 application of PCT Application No. PCT/JP2003/015841, filed on Dec. 11, 2003, the entire contents of which are hereby incorporated by reference.

FIELD OF THE INVENTION

The present invention relates to laminated veneer lumber of diagonal type in which veneer sheets are glued or laminated together with the wood grain thereof oriented diagonally or obliquely with respect the lateral sides of the lumber (such laminated veneer lumber may be referred to as "diagonal LVL"). The invention relates also to a method of manufacturing such diagonal laminated veneer lumber.

BACKGROUND OF THE INVENTION

As the wood board which is made by laminating veneer sheets by adhesive, glued laminated wood such as laminated lumber, plywood having veneer sheets laminated together such that any two adjacent veneer sheets are arranged with the wood grain thereof oriented perpendicularly to each other, laminated veneer lumber (LVL) in which constituent veneer sheets are laminated together with the wood grain thereof extending parallel to each other, etc. have been known in the art.

General demand for the wood board or panel is changing from plywood to a wood board such as oriented strand board (OSB), which is also referred to as waferboard, wherein the constituent element thereof is not veneer, but smaller pieces of wood called strands which are arranged with the wood grain thereof discrete or interrupted. A reason for such increasing demand for OSB is its greater in-plane shear strength as compared with plywood.

FIG. 6(A) schematically shows plywood in which one of two adjacent veneer sheets thereof has its wood grain extending substantially parallel to one side of the plywood board and the other of the two adjacent veneer sheets has its wood grain extending substantially perpendicular to the above one side of the plywood board, while FIG. 6(B) shows plywood of another type in which two adjacent veneer sheets thereof have their wood grain extending diagonally in opposite directions at about 45° so that the wood grain of the two veneer sheets are oriented perpendicularly to each other (straight and dotted lines in the square frame represent the wood grain directions of the two adjacent veneer sheets, respectively). FIG. 6(C) shows particleboard (PB). Values provided below the square frames in FIG. 6 represent the shear strengths of the respective board materials.

It has been known in the art that plywood which is made by clipping veneer sheets and arranging such clipped veneer sheets with the grain thereof oriented diagonally at about 45° with respect to the ends or lateral sides of the plywood board, as shown in FIG. 6(B), has a shearing strength that is greater than that of particleboard. As shown in FIG. 5, it has been also known that the shear modulus becomes the greatest when the veneer sheets are arranged with the wood grain thereof oriented diagonally at about 45° with respect to shear plane. It has been known in the art, therefore, that veneer sheets may be cut and arranged as shown in FIG. 6(B) to overcome drawbacks of conventional plywood.

Since it is considered that particleboard (PB) shown in FIGS. 5 and 6 has substantially the same elements orientation as the aforementioned OSB, the strength of particleboard is substantially the same as that of OSB and the following description will be made based on such assumption.

However, no such plywood is seen in actual market that is strengthened as described above. A decisive reason for such disuse is that cutting the existing plywood boards for production of the above plywood board will waste substantially half of the material. Thus, even the possibility of the presence of plywood or veneer laminated board of the above-described structure has been very little considered. If the veneer laminated board which overcomes the drawbacks of conventional plywood by having its constituent veneer sheets arranged and laminated together with the grain thereof oriented diagonally at about 45° with respect to the ends or lateral sides of the resulting board is reasonably manufacturable, demand for such board having outstanding characteristics and performance will be created and the provision of such board will be desired by the market.

As shown in the Publication of Laid-open Japanese Patent Application, No. H9-248803, it has been known in the art that a plywood board may be reinforced by providing between any two adjacent veneer sheets of the plywood board an additional veneer sheet whose wood grain are oriented at about 45°, or an angle between 20° and 70°, with respect to the ends or lateral sides of the plywood board.

However, according to this method in which ordinary rotary-cut veneer sheets are clipped diagonally into lozenged or diamond-like shaped veneer sheets, each lozenged veneer sheet is further clipped into a smaller-sized rectangular veneer sheet by cutting off triangular end portions and such rectangular veneer sheet is laminated between any two veneer sheets in the plywood. However, this method of manufacturing plywood is disadvantageous in terms of labor cost and material cost.

According to the method of manufacturing diagonal laminated veneer lumber of the present invention, the constituent veneer sheets are laminated together with the wood grain thereof oriented diagonally with respect to the longitudinal ends or the lateral sides of the resulting board, as a result of which a wood board having a high strength can be produced. Specifically, the method of the present invention is advantageous in that conventional machines and equipment for peeling veneer sheet and clipping such veneer sheet and also the conventional manufacturing line can be used for mass production of the diagonal laminated veneer lumber of the present invention with a small cost and no waste of material.

Such technical and economical effects can bring about other effects as follows.

(1) Presently, no wood board having an in-plane shear strength corresponding to that of OSB is manufactured. The advent of the diagonal laminated veneer lumber of the present invention, whose strength is greater than OSB, can be a new promising product for the plywood industry.

(2) Further processing the diagonal laminated veneer lumber, various kinds of wood products with high performance such as horizontal members or beams and structural wall board can be provided.

(3) One of typical applications where OSB is used in large quantities in North America is the web for I-beam (also called as I-joist), which is due to high in-plane shear strength of OSB as compared with plywood. Since the diagonal laminated veneer lumber has an in-plane shear strength that is still greater than that of OSB, the diagonal laminated veneer lumber can be an effective OSB replacement capable of providing I-beam of a still higher performance.

(4) As described above, using the diagonal laminated veneer lumber of the present invention, horizontal structural member with high strength capability can be made. Thus, the use of such material makes it possible to design a long-spanned architecture with a higher degree of freedom, and the quantities of wall, beam and pillar members for use and hence the total cost for such architecture can be reduced.

(5) Cedar that is one of the typical species of wood in Japan has been suffering from sluggish demand. Cedar has a high strength for its lightweightness and such characteristics of cedar can be enhanced to the greatest extent by the present invention. Thus, cedar can be utilized as a new material and the invention can contribute to promoting the demand of cedar. Additionally, the present invention can be used to promote the effective utilization of wood available from thinning forest.

DISCLOSURE OF THE INVENTION

In order to solve the above problem, the present invention provides diagonal laminated veneer lumber having a plurality of layers of veneer (2'a) laminated together by adhesive into a board having a length and a width, wherein each of said layers of veneer (2'a) has a plurality of substantially parallelogram-shaped veneer sheets (1'a) each having two opposite sides which extend substantially along the wood grain of the veneer and also having a plurality of veneer pieces which are joined together in the direction of wood grain of the veneer thereby to form said parallelogram-shaped veneer sheet (1'a), said parallelogram-shaped veneer sheets (1'a) are laid or joined successively with two adjacent sides of any two adjacent parallelogram-shaped veneer sheets (1'a) set in abutment with each other thereby to from said layers of veneer (2'a), said two adjacent sides being said sides extending substantially along the wood grain of the veneer, and any two adjacent layers of veneer (2'a) are disposed in said diagonal laminated veneer lumber with the wood grain thereof oriented diagonally in opposite directions at an angle between 30° and 60° with respect to the length of the diagonal laminated veneer lumber.

The present invention also provides a method of manufacturing diagonal laminated veneer lumber comprising providing a rotary-cut veneer sheet (1) having longitudinal ends (b) to which the wood grain (a) of the veneer sheet (1) is oriented substantially perpendicularly, clipping said rotary-cut veneer sheet (1) along lines (c) extending perpendicularly to said longitudinal ends (b) into a plurality of substantially square- or rectangular-shaped veneer sheets (1a), joining said square- or rectangular-shaped veneer sheets (1a) successively at the longitudinal ends (b) thereof thereby to from a band of joined veneer (1'), clipping said band of joined veneer (1') along lines (c') extending diagonally at an angle with respect the lateral sides of said band of joined veneer (1') (or the lines (c) of said rotary-cut veneer sheet (1)) into a plurality of substantially parallelogram-shaped veneer sheets (1'a), laying or joining said parallelogram-shaped veneer sheets (1'a) successively with two adjacent sides of any two adjacent parallelogram-shaped veneer sheets (1'a), which sides extend substantially along the wood grain of the veneer, set in abutment with each other thereby to from a plurality of layers of veneer (2'a), and laminating said plurality of layers of veneer (2'a) together such that any two adjacent layers of veneer (2'a) are disposed in said diagonal laminated veneer lumber with the wood grain thereof oriented diagonally in opposite directions at an angle between 30° and 60° with respect to the longitudinal direction of the diagonal laminated veneer lumber.

According to the invention, the two adjacent layers of veneer (2'a) are disposed with the wood grain thereof oriented diagonally at about 45° with respect to the length of the diagonal laminated veneer lumber.

PREFERRED EMBODIMENT OF THE INVENTION

For better understanding of the present invention, reference is made to FIG. 1 which shows the steps of clipping a sheet of veneer 1 which has been rotary-cut, for example, by a rotary lathe and then laminating the clipped veneer sheets 1a together in know method of manufacturing diagonal laminated veneer lumber.

Figure 1A:
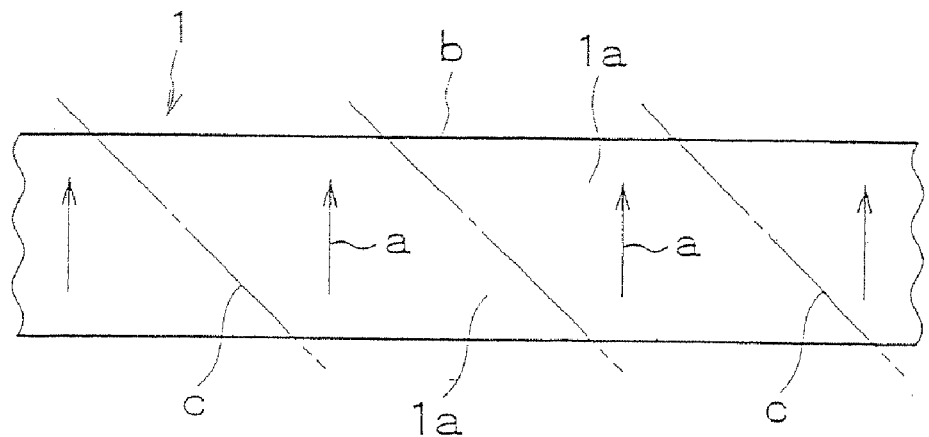
FIGS. 1(A) and 1(B) are plan views illustrating a known method of manufacturing diagonal laminated veneer lumber, showing the steps of clipping a veneer sheet and of gluing or laminating the clipped veneer sheets, respectively.

As is well known in the art, the rotary-cut veneer sheet 1 has a longitudinal dimension as measured along the wood grain which is oriented substantially perpendicularly to the opposite longitudinal ends b of the veneer sheet 1 as indicated by symbol a in FIG. 1(A). The veneer sheet 1 is clipped along cutting lines c spaced at a predetermined interval and extending diagonally at an angle in either direction with respect to the longitudinal ends b (or at about 45° downwardly leftward as seen in the plan view in the illustrated example) into a plurality of substantially lozenge-shaped veneer sheets 1a, as shown in FIG. 1(A).

The lozenge-shaped veneer sheet 1 may have any thickness depending on the application or usage of the final board product, ranging, for example, 1.00 mm to 6.5 mm, and the species or quality of the veneer sheet 1 is not particularly specified as far as the veneer sheet is strong enough and suitable for manufacturing of plywood or any other similar veneer laminated wood. Clipping of the veneer sheet 1 may be done by any suitable veneer clipping machine (not shown) of the type which is generally used in the art.

Figure 1B:
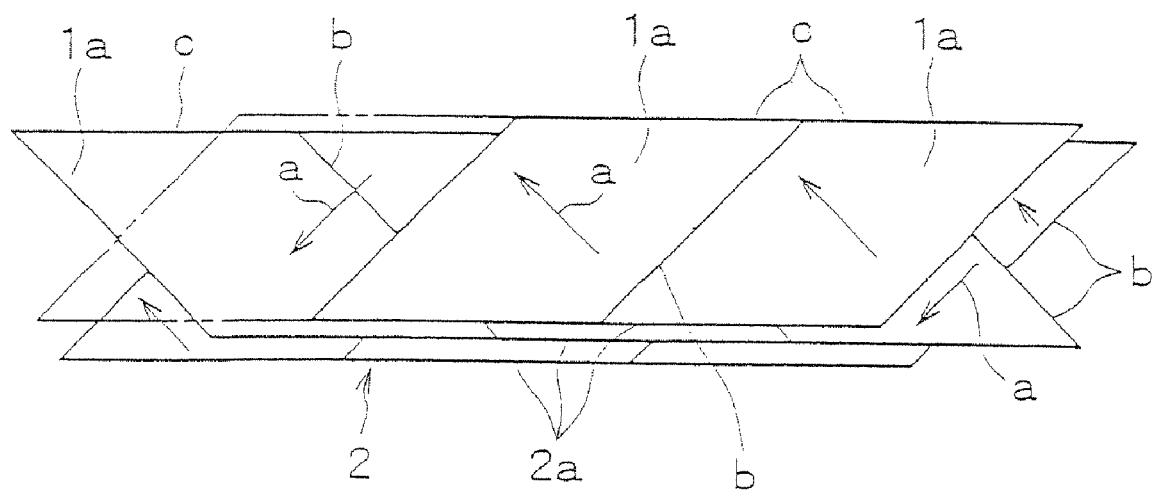

FIG. 1(B) shows a the step of joining the clipped lozenge-shaped veneer sheets 1a into a continuous layer of veneer 2a and then laminating a plurality of such layers of veneer 2a thereby to make a board of diagonal laminated veneer lumber 2 in the form that is similar to plywood. It is noted that for the sake of clear understanding of the manner of veneer lamination and structure thereof, the layers of veneer 2a are shown staggered vertically and part of the top layer is cut off to show the relationship between any two adjacent layers of veneer 2a in the diagonal laminated veneer lumber 2.

In the example shown in the drawing, the lozenge-shaped veneer sheets 1a are laid or arranged successively with two adjacent sides of any two adjacent lozenged veneer sheets 1a set in abutment with each other such that the wood grain of the veneer sheets 1a of each veneer layer 2a is oriented in the same direction that is diagonal to the lateral side c (or the clipped side of lozenge-shaped veneer sheet 1a), thereby forming a layer of veneer 2a. Then, a plurality of such layers of veneer 2a are laminated together so that the wood grain thereof is oriented diagonally at an angle (about 45° in the illustrated example) with respect to the lateral sides of the resulting board 2 as indicated by the wood grain direction a. It is noted that the lozenge-shaped small veneer sheets 1a may be joined by glue at the longitudinal ends b thereof for forming the layer of veneer 2a.

In the illustrated example, the wood grain a of any two adjacent layers of veneer 2a disposed one on the other is oriented in opposite diagonal directions so that the wood grain directions a of the two adjacent veneer sheet layers 2a intersect at about 90°.

Arranging layers of veneer 2a in a stack with the wood grain thereof oriented in alternately opposite diagonal directions and with adhesive interposed between any two adjacent layers of veneer 2a, and then gluing the stack of veneer layers 2a under a pressure (while applying heat as required) in a conventional known manner, a board of diagonal laminated veneer lumber 2 is produced in which the veneer layers 2a are disposed in the resulting board 2 such that the wood grain thereof are oriented at about 45° with respect to the lateral sides of the board 2 and also that the wood grain of any two adjacent veneer layers 2a are oriented so as to intersect at about 90°.

It is noted that for the sake of description each layer of veneer 2a shown in FIG. 1(B) has at opposite ends thereof triangular portions having an acute angle of about 45°, but such triangular corner portions will be cut off after the diagonal laminated veneer lumber 2 has been completed. Alternatively, such triangular portions may be removed from the layers of veneer 2a before they are arranged in a stack for lamination.

Figure 2A:
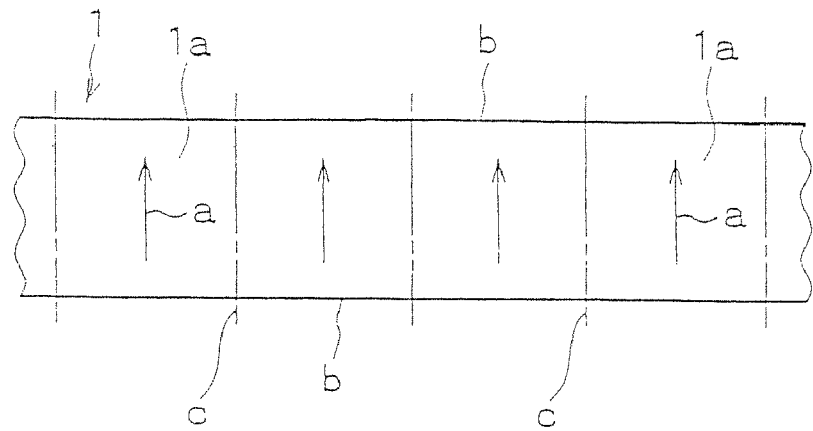
FIGS. 2(A), 2(B) and 2(C) are plan views showing steps of an embodiment of the method of manufacturing diagonal laminated veneer lumber according to the present invention, including clipping of a veneer sheet, joining the clipped veneer pieces and further clipping a sheet of joined veneer, and laminated layers of veneer into diagonal laminated veneer lumber.
Figure 2B:
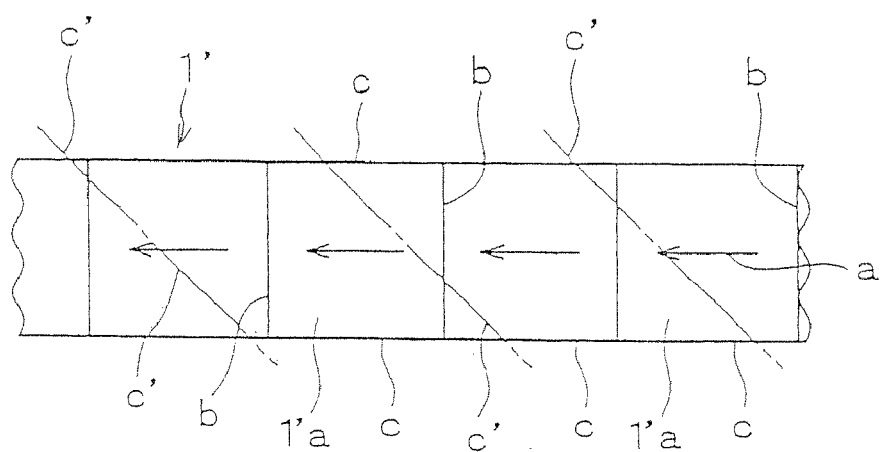
Figure 2C:
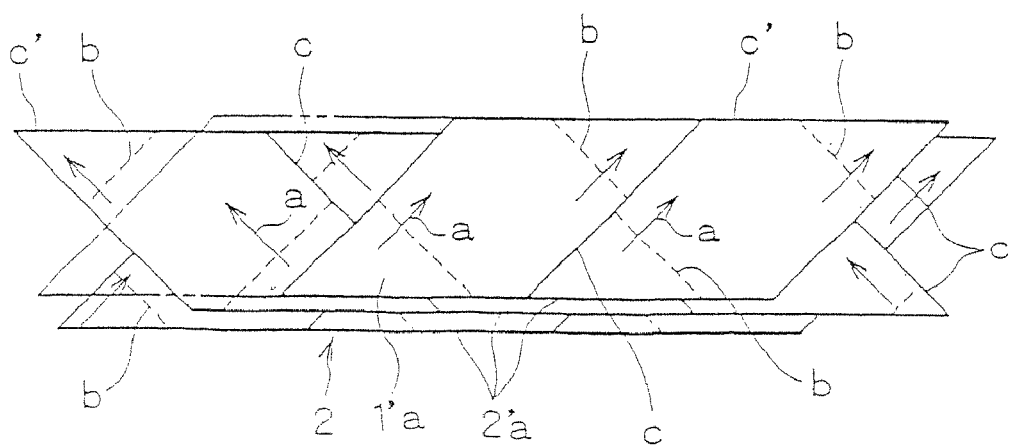

Reference is made to FIGS. 2(A) through 2(C) which show an embodiment of the present invention. In the following description, some like elements are designated by like reference numeral or symbols. A rotary-cut veneer sheet 1 is clipped along cutting lines c extending substantially in the same direction as the wood grain a of the veneer sheet 1 (i.e. the direction extending perpendicularly to the opposite longitudinal ends b of the veneer sheet 1) into a plurality of small veneer sheets 1a of a substantially square or rectangular shape. Subsequently, a number of thus clipped small veneer sheets 1a are arranged or joined successively with any two adjacent non-clipped sides (longitudinal ends b) of any two adjacent veneer sheets 1a set in abutment with each other as shown in FIG. 2(B) thereby to form a band of veneer 1' whose wood grain are oriented generally along the lateral sides c (or the previous cutting lines in FIG. 2(A)).

As shown in FIG. 2(B), the band of joined veneer 1' is clipped along cutting lines c' extending diagonally at about 45° with respect to the lateral sides c of the band of veneer 1' (hence extending diagonally at the same angle of about 45° with respect to the wood grain direction a) into a plurality of veneer sheets 1'a of a lozenge or parallelogram shape.

Then referring to FIG. 2(C), the parallelogram-shape veneer sheets 1'a are joined one after another at the sides thereof corresponding to the previous cutting lines c into a plurality of layers of joined veneer 2'a and such layers of veneer 2'a are arranged and laminated together in the same manner as described with reference to FIG. 1(B), thus a board of diagonal laminated veneer lumber 2 according to the present invention being formed. Triangular corner portions, as referred to previously in FIG. 1(B), will be cut off after the diagonal laminated veneer lumber 2 has been completed.

Figure 3:
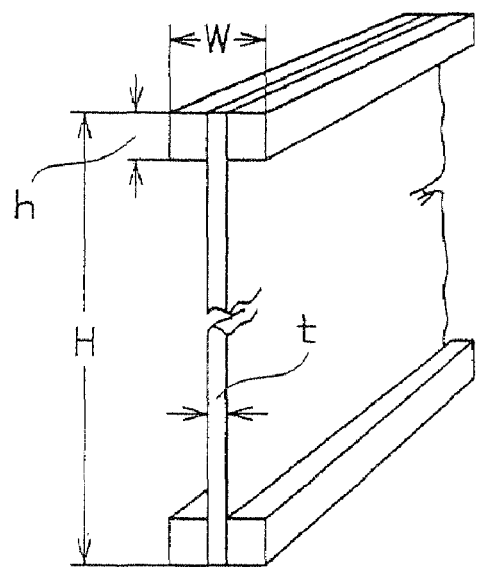
FIG. 3 is a partial perspective view showing the structure of an I-beam as a test piece used for comparison of strength of I-beams made of the diagonal laminated veneer lumber made according to present invention and other wood boards.

FIG. 3 shows an I-beam 3 used as a test piece for comparison of the strength of various I-beams made of the diagonal laminated veneer lumber 2 made according to the method described with reference to FIG. 2, conventional OSB and plywood. The I-beam 3 has the following dimensions:

Board thickness (t)=9 mm

Top width (W) including web=49 mm

Web height (h)=26 mm

Total height (H)=150 mm

Figure 4:
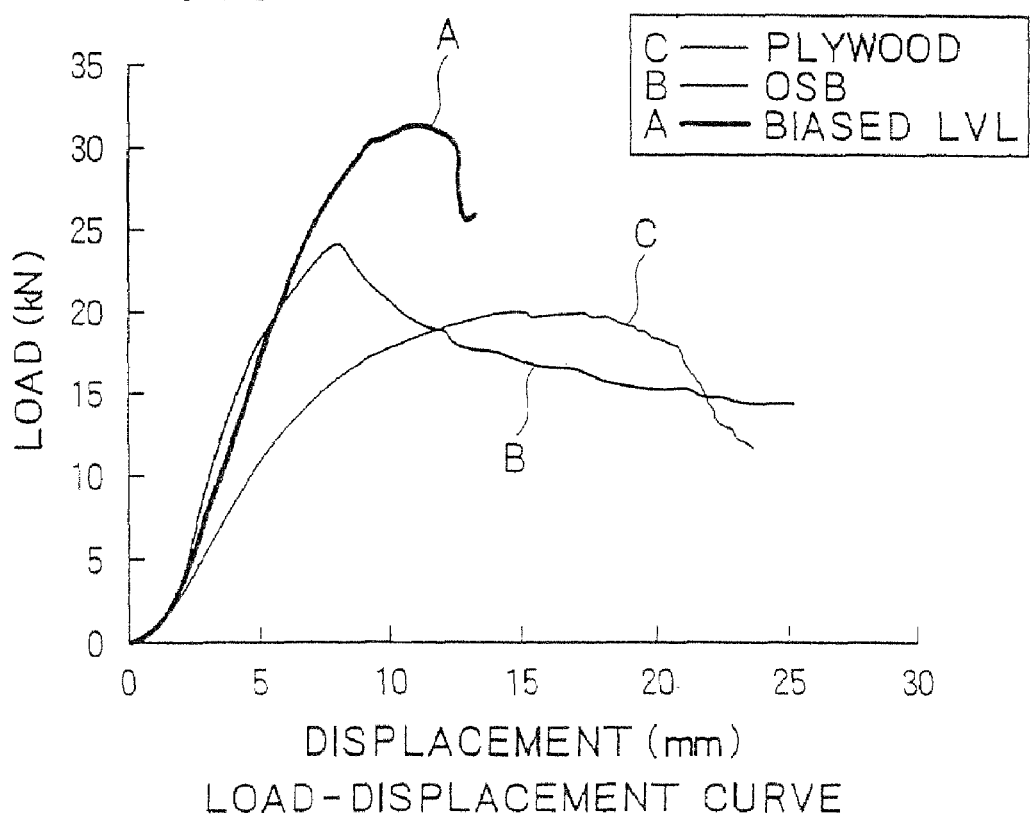
FIG. 4 is a graph showing the test results or load-deflection curves of three different test pieces of FIG. 3.

The results of three-point bending test of respective I-beams 3 made of three different wood materials are shown by the load-deflection curves in the graph of FIG. 4. As apparent from the graph, it has been found from the test that the diagonal LVL of the present invention showed smaller deflection against the application of load as compared with plywood and OSB.

TABLE 1 below shows comparison of the strengths of the I-beams 3 of three different materials, wherein values for the plywood are set at 100 as reference value. TABLE 1 has also clarified that the diagonal LVL of the present invention is superior in strengths to plywood and OSB.

|  | Diagonal LVL | OSB | Plywood |
| --- | --- | --- | --- |
| Bending strength | 145 | 122 | 100 |
| Proportional limit of bending | 154 | 130 | 100 |
| Young's modulus | 168 | 165 | 100 |

Figure 5:
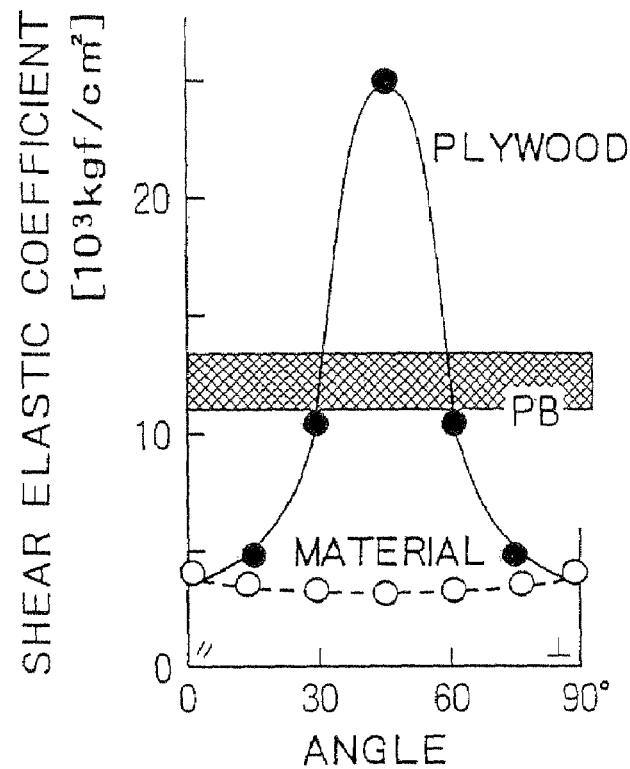
FIG. 5 is a graph showing variation of shear modulus depending on the orientation angle of the wood grain of plywood in comparison with other wood materials.
Figure 6A:
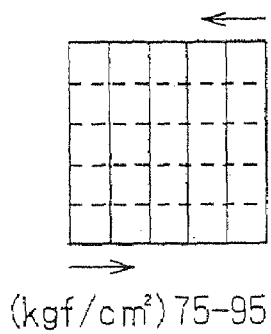
FIGS. 6(A), 6(B) and 6(C) show two different kinds of plywood having different wood grain orientations and a particleboard (PB) together with the shear strengths thereof.
Figure 6B:
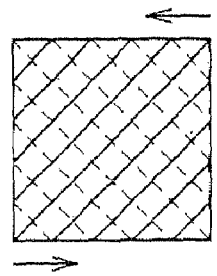
Figure 6C:
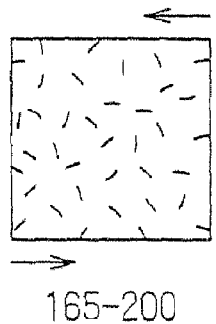

As is apparent from FIGS. 5 and 6, the strength of the diagonal laminated veneer lumber 2 becomes the greatest when the constituent veneer sheets are arranged with the wood grain thereof oriented diagonally at about 45° with respect to the longitudinal ends or lateral sides of the board. It is noted, however, that the board having the wood grain thereof oriented at a diagonal angle between 30° and 45° has a strength which substantially corresponds to that of OSB and, therefore, it can be used for practical applications. It is also noted that the layers of veneer 2'a for lamination need not have the wood grain thereof oriented in opposite directions alternately, but any layer of veneer whose wood grain is oriented perpendicular or parallel to the lateral sides of the board may be interposed between any two adjacent layers of veneer 2'a. It is further noted that, although the wood grain direction a is indicated by a single-head arrow directing in one direction, but it may be directed in the opposite direction.

INDUSTRIAL UTILIZATION OF THE INVENTION

The laminated veneer lumber of the present invention can be widely utilized for structural material for building such as board, beam and column.

What is claimed is:

1. Method of manufacturing diagonal laminated veneer lumber comprising:

providing a rotary-cut veneer sheet (1) having longitudinal ends (b) to which the wood grain (a) of the veneer sheet (1) is oriented substantially perpendicularly, clipping said rotary-cut veneer sheet (1) along lines (c) extending perpendicularly to said longitudinal ends (b) into a plurality of substantially square- or rectangular-shaped veneer sheets (1a), joining said square- or rectangular-shaped veneer sheets (1a) successively at the longitudinal ends (b) thereof thereby to from a band of joined veneer (1'), clipping said band of joined veneer (1') along lines (c') extending diagonally at an angle with respect the lateral sides of said band of joined veneer (1') (or the lines (c) of said rotary-cut veneer sheet (1) into a plurality of substantially parallelogram-shaped veneer sheets (1'a), laying or joining said parallelogram-shaped veneer sheets (1'a), successively with two adjacent sides of any two adjacent parallelogram-shaped veneer sheets (1'a), which sides extend substantially along the wood grain of the veneer, set in abutment with each other thereby to from a plurality of layers of veneer (2'a), and laminating said plurality of layers of veneer (2'a) together such that any two adjacent layers of veneer (2'a) are disposed in said diagonal laminated veneer lumber with the wood grain thereof oriented diagonally in opposite directions at an angle between 30° and 60° with respect to the longitudinal direction of the diagonal laminated veneer lumber.

2. Method of manufacturing diagonal laminated veneer lumber according to claim 1, wherein said laminating a plurality of the layers of veneer (2'a) together is performed such that said two adjacent layers of veneer (2'a) are disposed with the wood grain thereof oriented diagonally at about 45° with respect to the longitudinal direction of the diagonal laminated veneer lumber.

3. Method of manufacturing diagonal laminated veneer lumber according to claim 1, wherein said laying or joining the parallelogram-shaped veneer sheets (1'a) successively and said laminating a plurality of the layers of veneer (2'a) together are performed simultaneously.

* * * * *